US012564290B2

(12) United States Patent
Bradley et al.

(10) Patent No.: US 12,564,290 B2
(45) Date of Patent: Mar. 3, 2026

(54) MAGNETIC COMPASS INTERLOCK VESSEL DETECTION AND VESSEL RECOGNITION DEVICE

(71) Applicant: WHIRLPOOL CORPORATION, Benton Harbor, MI (US)

(72) Inventors: Samuel J. Bradley, Mundelein, IL (US); Edward James Haney, St. Joseph, MI (US); Andrew John Leitert, Eau Claire, MI (US); Pravin R. Shewale, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 539 days.

(21) Appl. No.: 18/153,651

(22) Filed: Jan. 12, 2023

(65) Prior Publication Data

US 2024/0237855 A1     Jul. 18, 2024

(51) Int. Cl.
*A47J 43/046*        (2006.01)
*A47J 43/07*         (2006.01)
(52) U.S. Cl.
CPC .......... *A47J 43/0465* (2013.01); *A47J 43/07* (2013.01)
(58) Field of Classification Search
CPC ......... A47J 43/07; A47J 43/0465; A47J 43/06
See application file for complete search history.

(56) References Cited

U.S. PATENT DOCUMENTS

| | | | |
|---|---|---|---|
| 8,985,488 B2 * | 3/2015 | Hidalgo ................. | A47J 36/10 |
| | | | 241/282.1 |
| 11,297,980 B2 | 4/2022 | Kolar | |
| 2009/0084274 A1 | 4/2009 | Kovacic et al. | |
| 2016/0256005 A1 * | 9/2016 | Dickson, Jr. ............ | B01F 27/61 |
| 2018/0078094 A1 * | 3/2018 | Haney ................. | A47J 43/0761 |
| 2022/0087480 A1 * | 3/2022 | Kolar ................. | A47J 43/0777 |
| 2022/0240723 A1 * | 8/2022 | Sergyeyenko ........ | A47J 43/082 |

FOREIGN PATENT DOCUMENTS

| | | |
|---|---|---|
| EP | 3264954 B1 | 5/2020 |
| EP | 4306018 A2 | 1/2024 |
| WO | 2022000022 A1 | 1/2022 |
| WO | 2022191470 A1 | 9/2022 |
| WO | 2022207237 A1 | 10/2022 |

* cited by examiner

*Primary Examiner* — Marc C Howell
(74) *Attorney, Agent, or Firm* — Price Heneveld LLP

(57) ABSTRACT

A food processing appliance includes a base configured to selectively receive a plurality of vessel types. At least one of the plurality of vessel types includes a first magnetic key that includes at least one magnet disposed in a first arrangement of magnets along at least two axes. A magnetic compass assembly that is located on the base is configured to detect a reading that includes a presence and location of magnets on the at least two axes. The food processing appliance also includes a processor and a memory. The memory includes instructions that, when executed by the processor, cause the processor to receive the reading from the magnetic compass assembly and identify the at least one vessel type from the plurality of vessel types based on the first arrangement of the at least one magnet.

20 Claims, 8 Drawing Sheets

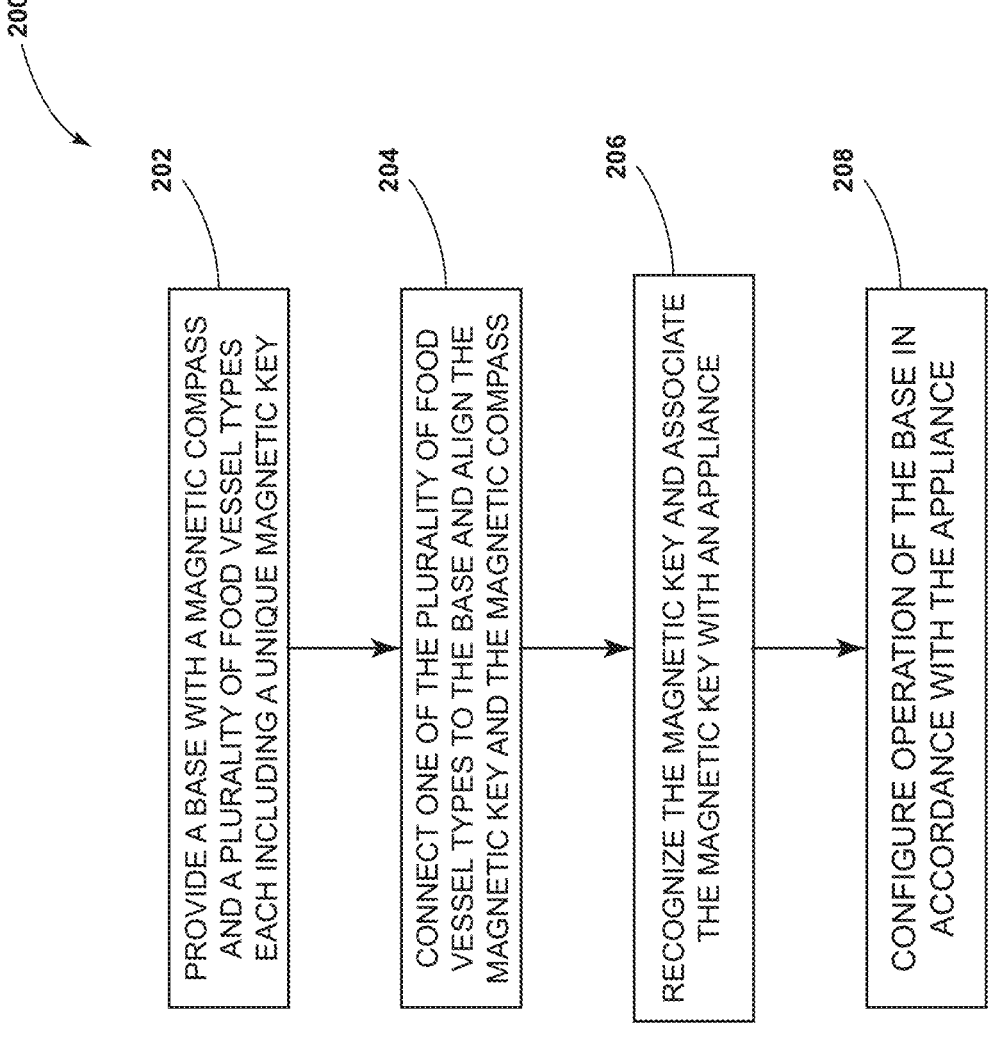

200

202 — PROVIDE A BASE WITH A MAGNETIC COMPASS AND A PLURALITY OF FOOD VESSEL TYPES EACH INCLUDING A UNIQUE MAGNETIC KEY

204 — CONNECT ONE OF THE PLURALITY OF FOOD VESSEL TYPES TO THE BASE AND ALIGN THE MAGNETIC KEY AND THE MAGNETIC COMPASS

206 — RECOGNIZE THE MAGNETIC KEY AND ASSOCIATE THE MAGNETIC KEY WITH AN APPLIANCE

208 — CONFIGURE OPERATION OF THE BASE IN ACCORDANCE WITH THE APPLIANCE

FIG. 8

MAGNETIC COMPASS INTERLOCK VESSEL DETECTION AND VESSEL RECOGNITION DEVICE

BACKGROUND OF THE DISCLOSURE

The present disclosure generally relates to a food processing appliance, and, more specifically, to a food processing appliance with a magnetic compass assembly.

SUMMARY OF THE DISCLOSURE

According to one aspect of the present disclosure, a food processing appliance includes a base configured to selectively receive a plurality of vessel types. At least one of the plurality of vessel types includes a first magnetic key that includes at least one magnet disposed in a first arrangement of magnets along at least two axes. A magnetic compass assembly that is located on the base is configured to detect a reading that includes a presence and location of magnets on the at least two axes. The food processing appliance also includes a processor and a memory. The memory includes instructions that, when executed by the processor, cause the processor to receive the reading from the magnetic compass assembly and identify the at least one vessel type from the plurality of vessel types based on the first arrangement of the at least one magnet.

According to another aspect of the present disclosure, a food processing appliance includes a base configured to selectively receive a plurality of vessel types. At least one of the plurality of vessel types includes a first magnetic key that includes at least two magnets disposed in a first arrangement of magnets along at least two axes. A magnetic compass assembly that is located on the base is configured to detect a reading that includes a presence and location of magnets on the at least two axes. The plurality of vessel types also includes a processor and a memory. The memory includes instructions that, when executed by the processor, cause the processor to receive the reading from the magnetic compass assembly and identify the at least one vessel type from the plurality of vessel types based on the first arrangement of the at least two magnets.

According to yet another aspect of the present disclosure, a food processing appliance includes a base configured to selectively receive a plurality of vessel types. A magnetic compass assembly that is located on the base is configured to detect a reading that includes a presence and location of magnets on at least two axes. The plurality of vessel types includes a first vessel type that has a first appliance. The first vessel type includes a first magnetic key that includes at least one magnet disposed in a first arrangement of magnets along the at least two axes. The plurality of vessel types further includes a second vessel type that has a second appliance. The second vessel type includes a second magnetic key that includes at least one magnet disposed in a second arrangement of magnets along the at least two axes. The plurality of vessel types also includes a processor and a memory. The memory includes instructions that, when executed by the processor, cause the processor to receive the reading from the magnetic compass assembly and identify which of the first vessel type or the second vessel type is connected to the base from a reading by the magnetic compass assembly of the first arrangement or the second arrangement of the at least one magnet and configure operational parameters of the base in accordance with the first appliance or the second appliance.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 8 is a method flow chart of a process of using a food processing appliance with a plurality of vessel types according to an aspect of the present disclosure.

Figure 1:
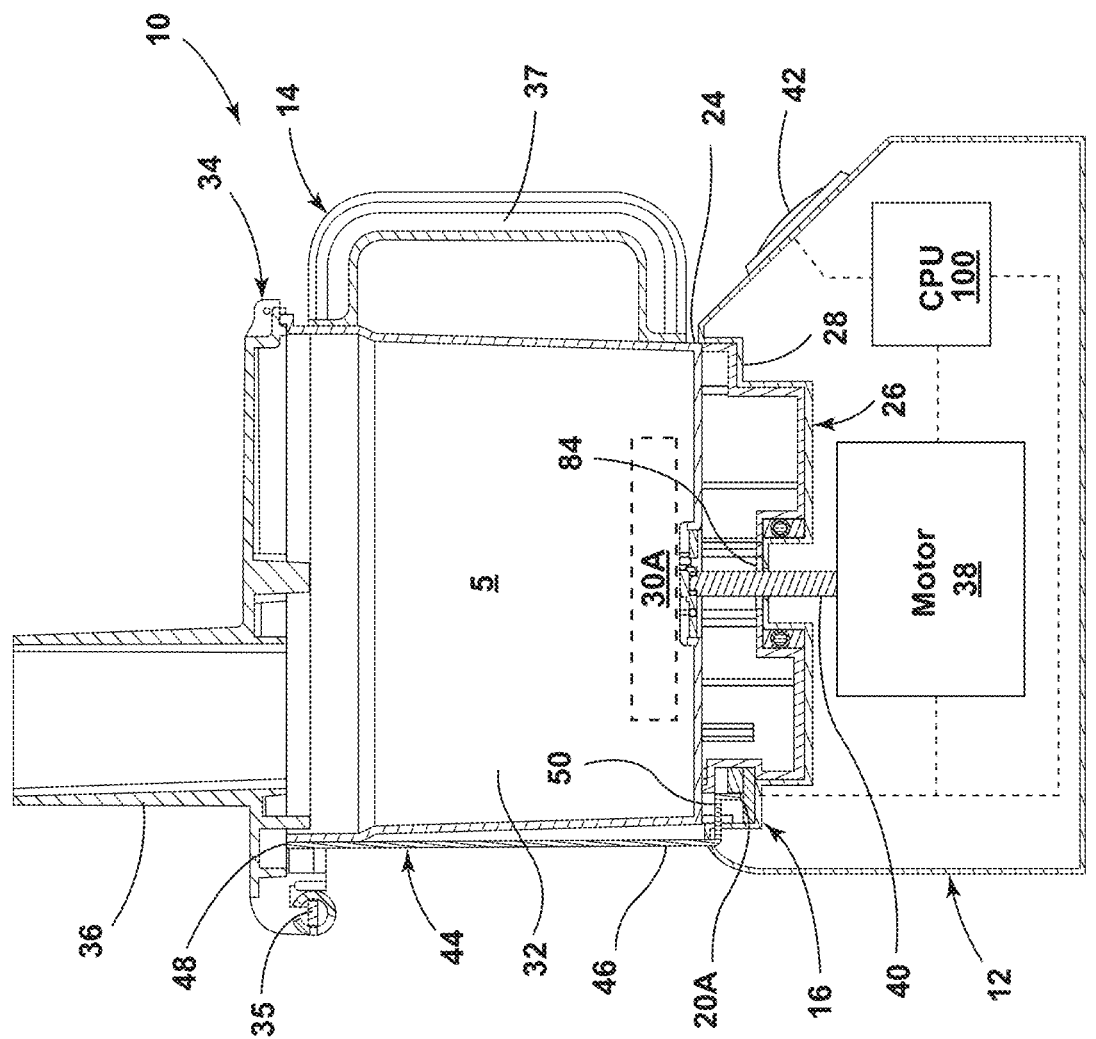
FIG. 1 is a side cross-sectional view of a food processing appliance having a lib in a closed position according to an aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a food processing appliance with a magnetic compass assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figures 6A, 6B, 6C, 6D, 6E, 6F, 6G, 6H, 6I, 6J, 6K, 6L:
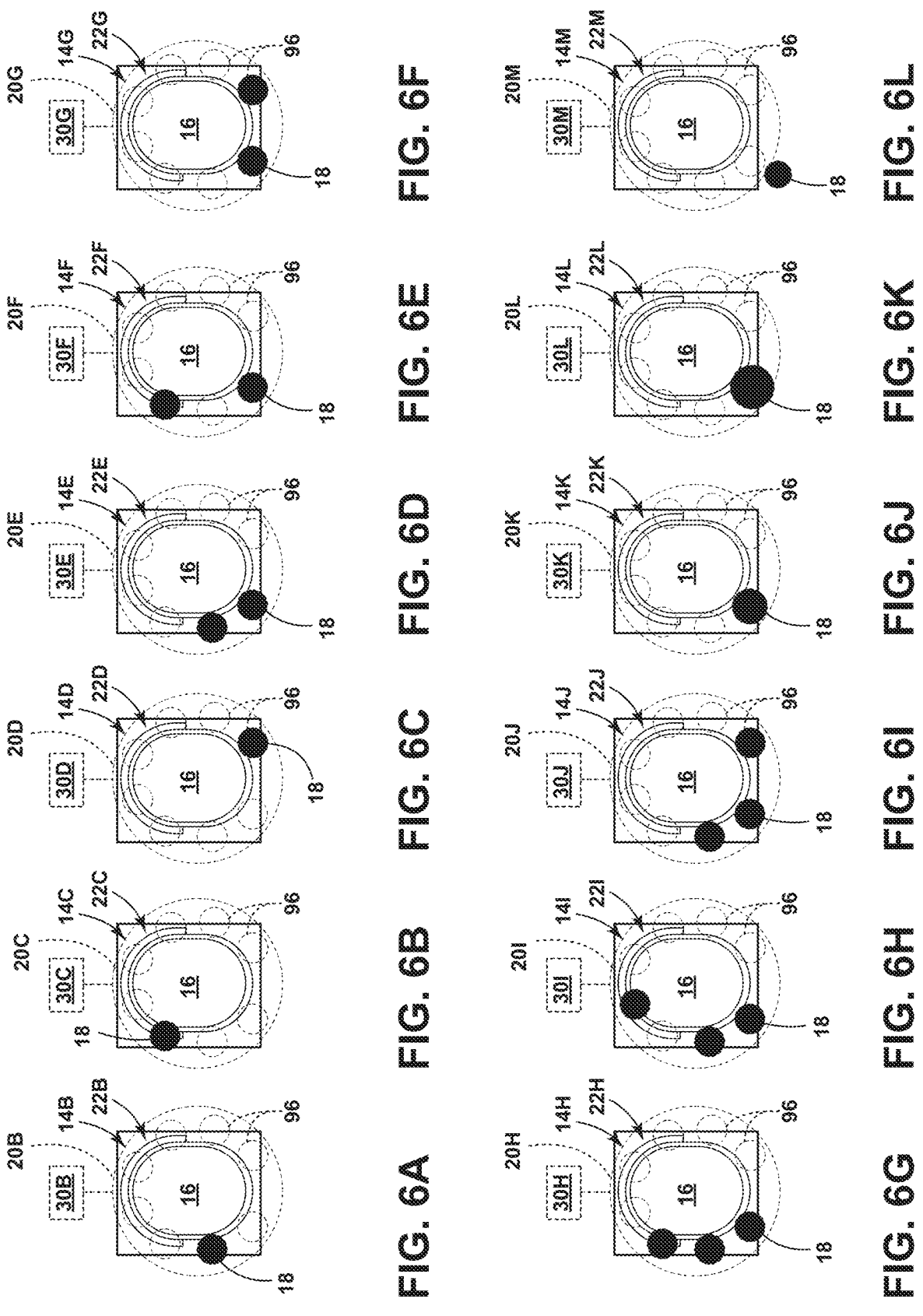
FIG. 6A is a top sectional view of a magnetic compass assembly and a second arrangement of magnets according to an aspect of the present disclosure.
FIG. 6B is a top sectional view of a magnetic compass assembly and a third arrangement of magnets according to an aspect of the present disclosure.
FIG. 6C is a top sectional view of a magnetic compass assembly and a fourth arrangement of magnets according to an aspect of the present disclosure.
FIG. 6D is a top sectional view of a magnetic compass assembly and a fifth arrangement of magnets according to an aspect of the present disclosure.
FIG. 6E is a top sectional view of a magnetic compass assembly and a sixth arrangement of magnets according to an aspect of the present disclosure.
FIG. 6F is a top sectional view of a magnetic compass assembly and a seventh arrangement of magnets according to an aspect of the present disclosure.
FIG. 6G is a top sectional view of a magnetic compass assembly and an eighth arrangement of magnets according to an aspect of the present disclosure.
FIG. 6H is a top sectional view of a magnetic compass assembly and a ninth arrangement of magnets according to an aspect of the present disclosure.
FIG. 6I is a top sectional view of a magnetic compass assembly and a tenth arrangement of magnets according to an aspect of the present disclosure.
FIG. 6J is a top sectional view of a magnetic compass assembly and an eleventh arrangement of magnets according to an aspect of the present disclosure.
FIG. 6K is a top sectional view of a magnetic compass assembly and a twelfth arrangement of magnets according to an aspect of the present disclosure.
FIG. 6L is a top sectional view of a magnetic compass assembly and a thirteenth arrangement of magnets according to an aspect of the present disclosure.
Figure 7:
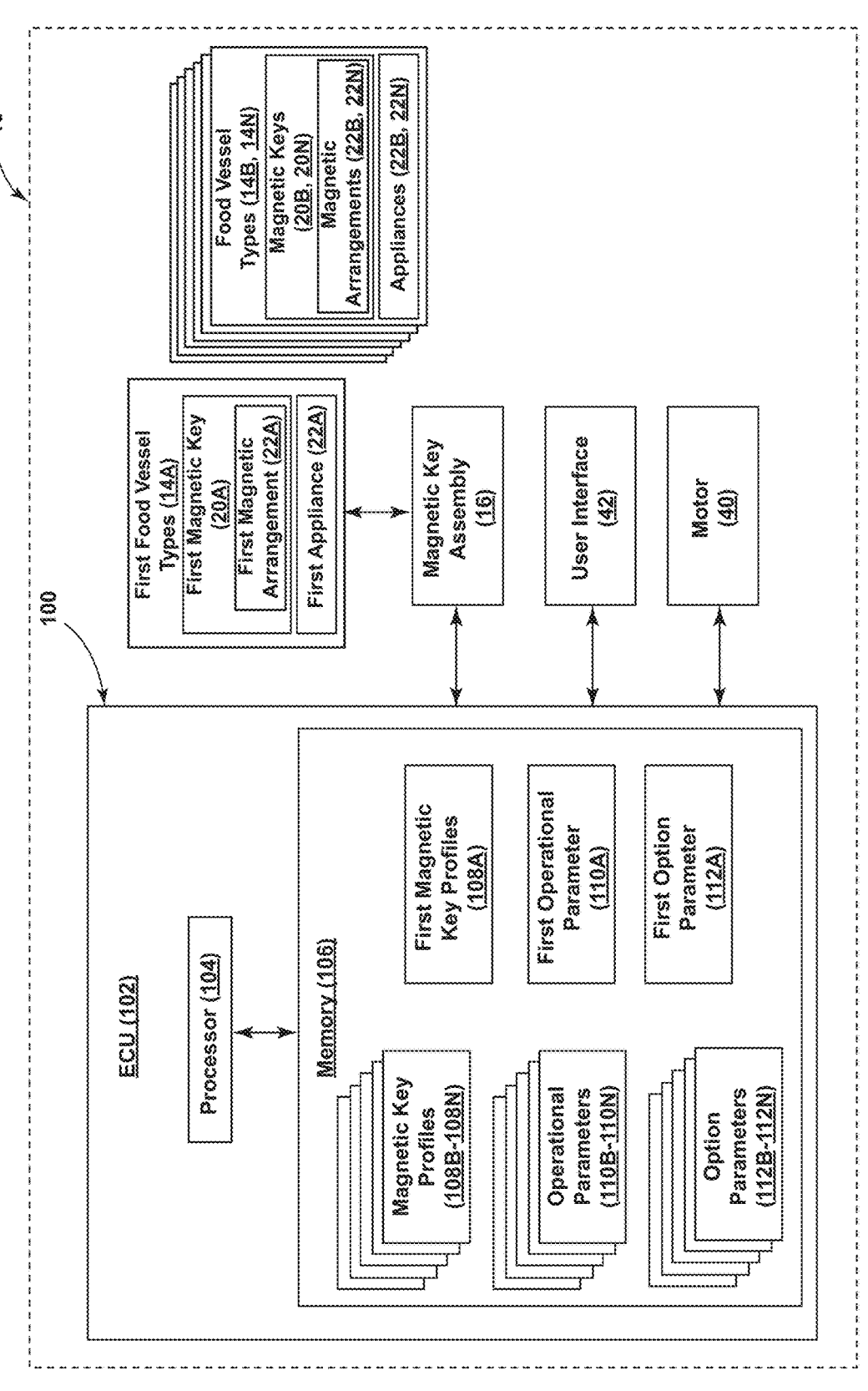
FIG. 7 is a schematic view of a control system in a food processing apparatus according to an aspect of the present disclosure.

Referring to FIGS. 1-7, reference numeral 10 generally designates a food processing appliance that includes a base 12 configured to selectively receive a plurality of vessel types 14A-14N. A magnetic compass assembly 16 is located on the base 12 and is configured to detect a reading that includes a presence and location of magnets 18 on at least two axes (e.g., at least two of an X-axis, a Y-axis, or a Z-axis). At least one of the plurality of vessel types 14A-14N (e.g., a first vessel type 14A) includes a first magnetic key 20A that includes at least one magnet 18 (FIG. 3) disposed in a first arrangement 22A along the at least two axes. The food processing appliance 10 includes a control system 100 that includes a processor 104 and a memory 106 (FIG. 7). The memory 106 includes instructions that, when executed by the processor 104, cause the processor 104 to receive the reading from the magnetic compass assembly 16 and identify the first vessel type 14A based on the first arrangement 22A of the at least one magnet 18.

With continued reference to FIGS. 1-5, the magnetic compass assembly 16 may include a magnetic sensor 15 (FIG. 3), such as a magnetometer, for example, a two-axis or a three-axis magnetometer. The plurality of vessel types are designated reference numerals "14A-14N," meaning a first vessel type 14A through an N vessel type, N representing all natural numbers. Each vessel type 14A-14N includes a unique magnetic key 20A-20N, the magnetic keys 20A-20N being distinguishable by the varying arrangements 22A-22N of magnets 18 (FIG. 7). As will be described in further detail below, the arrangements 22A-22N of magnets 18 may correspond to relative locations between the magnets 18 and/or strength of the magnets 18. In this manner, numerous vessel types 14A-14N can be disguised based on readings received by the magnetic compass assembly 16. In some embodiments, the multi-axis reading capability permits a single magnetic compass assembly 16 to perform the numerous distinguishable readings. By distinguishing between the readings, the processor 104 may, therefore, identify the vessel type 14A-14N and perform additional functionalities related to the specific vessel type 14A-14N identified. As will be described in greater detail below, these additional functionalities may relate to user options and operational parameters.

Figure 2:
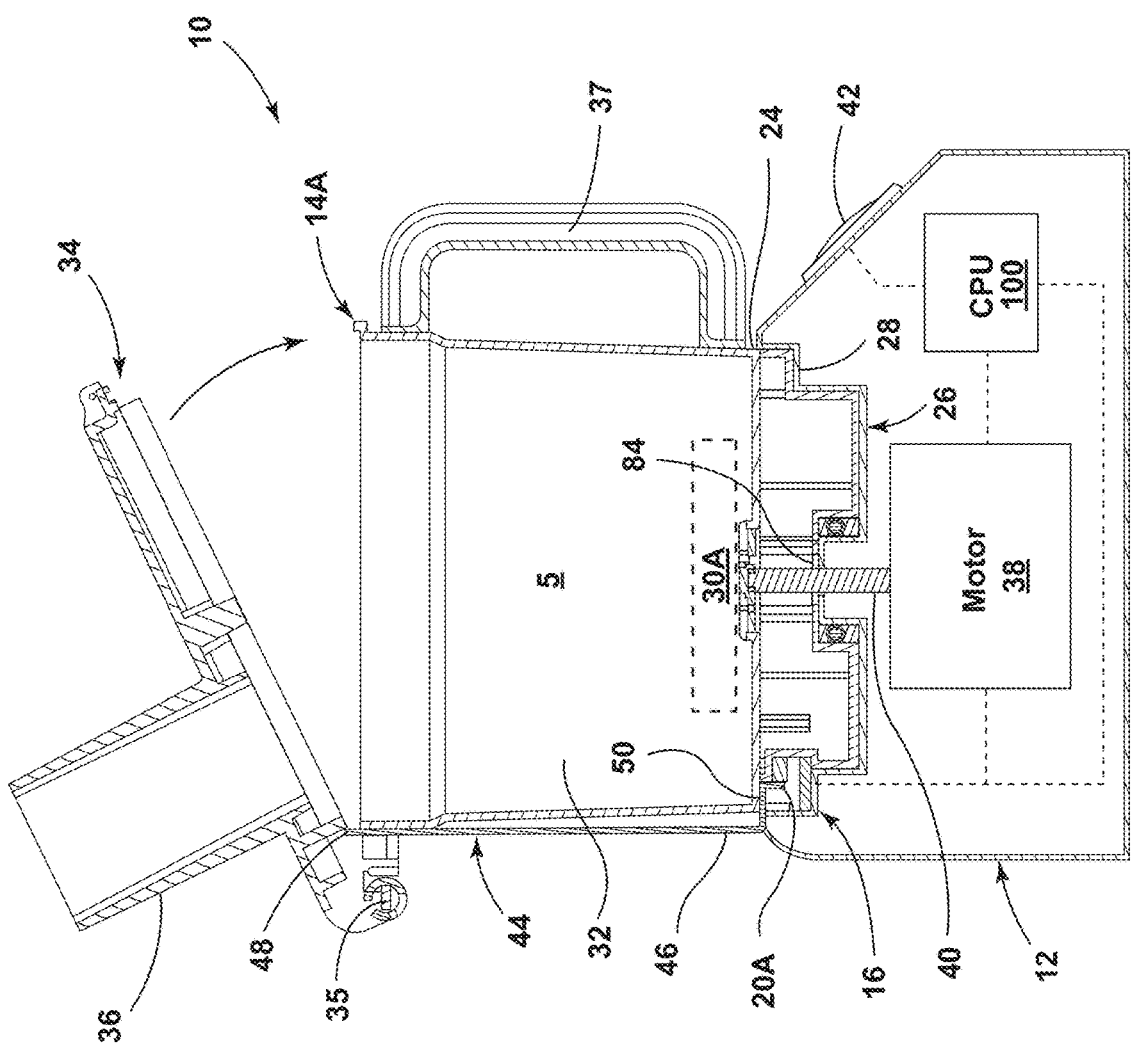
FIG. 2 is a side cross-sectional view of a food processing appliance having a lib in an open position according to an aspect of the present disclosure.

With reference now to FIGS. 1 and 2, the food processing appliance 10 is connected to the first vessel type 14A. The base 12 includes a top surface 24 defining a basin 26. The first vessel type 14A includes a bottom surface 28 that may be sized to be received within the basin 26. The first vessel type 14A may include a first appliance 30A that is configured for a first food processing functionality. It should be appreciated that, unless otherwise indicated, each vessel type 14A-14N may include a unique appliance 30A-30N and each unique appliance 30A-30N may have a different food processing functionality (FIG. 7). In this manner, the identification of the specific vessel type 14A-14N may correspond with the unique appliance 30A-30N and food processing functionality associated therewith. For example, the first appliance 30A may include a dicer blade (not shown) that is configured for the first food processing functionality (i.e., the dicing of food). It should also be appreciated that, other than the arrangements 22A-22N of magnets 18 in the magnetic keys 20A-20N and the appliances 30A-30B, each vessel type 14A-14N may share the same materials and structures, unless otherwise indicated.

With continued reference to FIGS. 1 and 2, the first food vessel 14A may include a bowl 32 that extends from the bottom surface 28, and a lib 34 that extends from the bowl 32 opposite the bottom surface 28. The lib 34 may include a chute 36 to introduce food to the first appliance 30A. The lib 34 may include a closed position (FIG. 1) where the first appliance 30A is ready to use and an open position (FIG. 2) where the processed food in the bowl 32 can be accessed. The lib 34 may connect to the bowl 32 via a hinge 35. The bowl 32 may include a handle 37 to facilitate connection of the first vessel type 14A to the base 12. The base 12 may include a motor 38 and the control system 100 is operably connected to the motor 38. The motor 38 is configured to rotatably power a drive mechanism or output drive hub 40, which, in turn, rotatably drives the first appliance 30A. In operation, food is located in the chute 36 (or bowl 32 when the lib 34 is in the open position) where it contacts the first appliance 30A. The first appliance 30A, as driven by the motor 38, then articulates (e.g., dices) the food and the processed food can be accessed from the bowl 32. A user interface 42 may be operably connected to the control system 100 for selecting user options relating to the processing functionality. For example, the speed of the motor 38, a time limit for processing, a pulse sequence for processing, settings particular to the type of food being processed, and/or the like. Depending on the appliance 30A-

30N, the user options may be defined by operational parameters. For example, upper and lower threshold values may be assigned to the speed of the motor 38, the time of processing, or other user options. While the first appliance 30A is illustrated as being located near a lower surface of the bowl 32, it should be appreciated that it may be located anywhere within the bowl 32 or lib 34.

Figure 3:
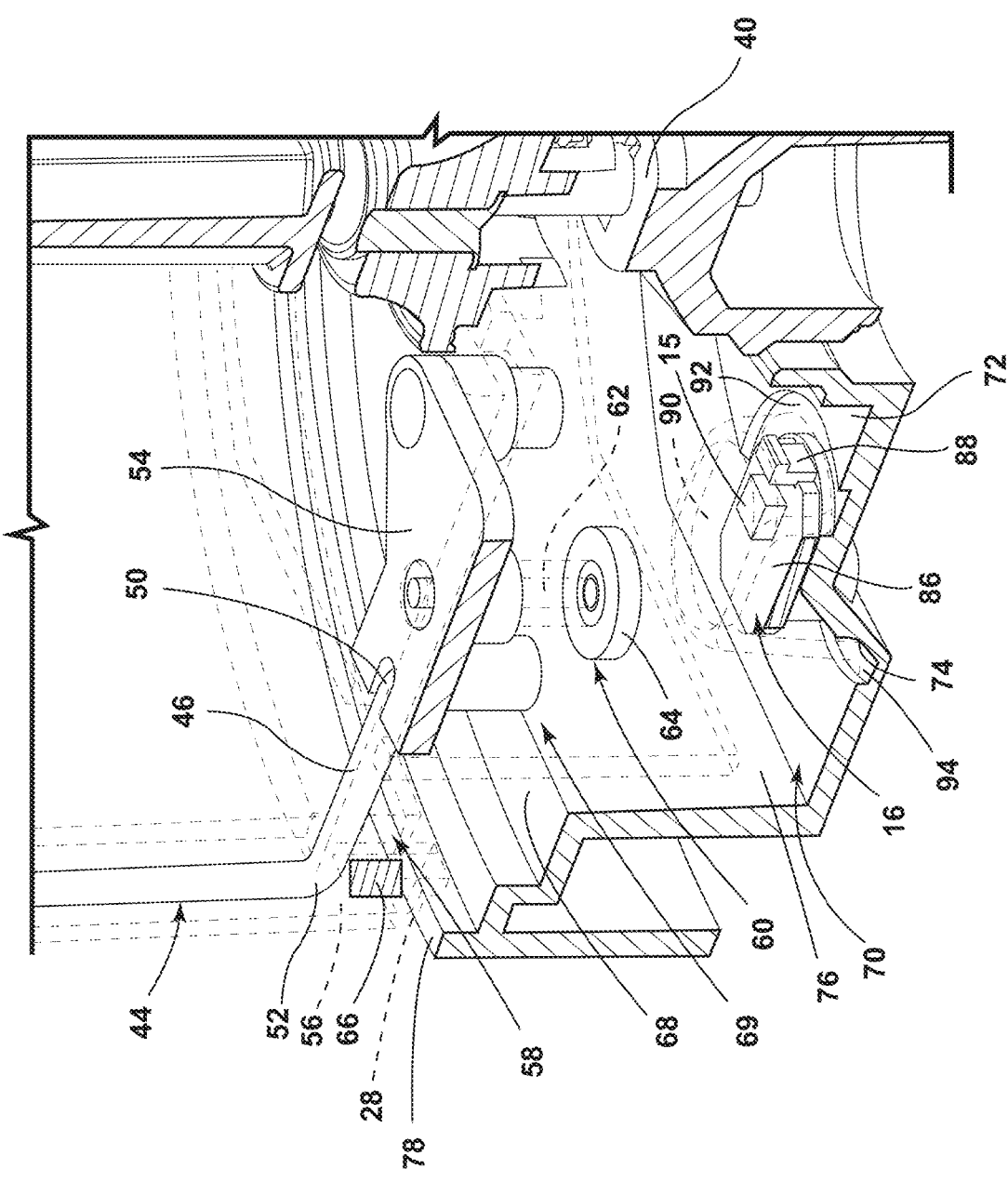
FIG. 3 is a top perspective sectional view of a food processing appliance according to an aspect of the present disclosure.

With reference now to FIGS. 1-3, the first magnetic key 20A may be located within (e.g., encased) or adjacent to the bottom surface 28 of the first vessel type 14A. In some embodiments, the first magnetic key 20A may be located on a carrier element 44 that is configured to articulate towards and away from the magnetic compass assembly 16. For example, the carrier element 44 may include a push rod 46 extending from the lib 34 to the bottom surface 28. More particularly, the push rod 46 may extend from a first end 48 located adjacent to the lib 34 to a second end 50 that connects to the first magnetic key 20A. The push rod 46 may include a bend 52 located near the second end 50 such that a portion of the push rod 46 extends inwardly within an outer perimeter of the top surface 24 of the base 12 to locate the first magnetic key 20A within close proximity of the magnetic compass assembly 16. The first magnetic key 20A may include a body 54 (FIG. 3) and the at least one magnet 18 is connected to the body 54. In some embodiments, the body 54 may include a planar surface that holds the at least one magnet 18 along a two-axis plane. In other embodiments, the body 54 may include a non-planar surface that holds the at least one magnet 18 within a 3-axis space.

With reference to FIG. 1, when the lib 34 is in the closed position, the first end 48 of the push rod 46 is pushed downwardly, which translates into similar downward movement of the first magnetic key 20A. With reference to FIGS. 2 and 3, when the lib 34 is in the open position, the push rod 46 is permitted to travel upwardly, which translates into similar upward movement of the first magnetic key 20A away from the magnetic compass assembly 16. In this manner, the proximity readings of the first magnetic key 20A relative to the magnetic compass assembly 16 can be distinguishable by the processor 104. As such, certain functions of the appliance 30A that are permitted when the lib 34 is in the closed position may not be available when the lib 34 is in the open position. For example, the motor 38 may be prevented from operating when the lib 34 is in the open position. It should be appreciated that the motor 38 may be prevented from operating via instructions from the control system 100 or by operation of a magnetic switch (not shown) such as a reed switch in close proximity to the magnetic compass assembly 16. As best illustrated in FIG. 3, the first vessel type 14A may include a rod channel 56 that extends between the lib 34 and the bottom surface 28. The push rod 46 may be at least partially located in the rod channel 56 such that the push rod 46 is substantially obscured. The rod channel 56 may terminate at a port 58 that is elongated in the vertical direction to accommodate movement of the push rod 46 between positions. The body 54 of the first magnetic key 20A may include a spacer 60 that extends towards the magnetic compass assembly 16. The spacer 60 may include a post 62 that extends from the body 54 to a head 64 that extends radially outwards from the post 62. The spacer 60 defines a space between the first magnetic key 20A and the magnetic compass assembly 16 when the first magnetic key 20A is in a readable position (e.g., when the lib is in the closed position). In some embodiments, a spring member 66 may bias the carrier element 44 in a direction away from the magnetic compass assembly 16. In this manner, as the lib 34 is moved to the open position, the spring member 66 pushes the carrier element 44, which is overcome upon moving the lib 34 to the closed position. For example, the spring member 66 may include a helical spring, the spring member 66 may be located in the rod channel 56 and in contact with the push rod 46.

Figure 4:
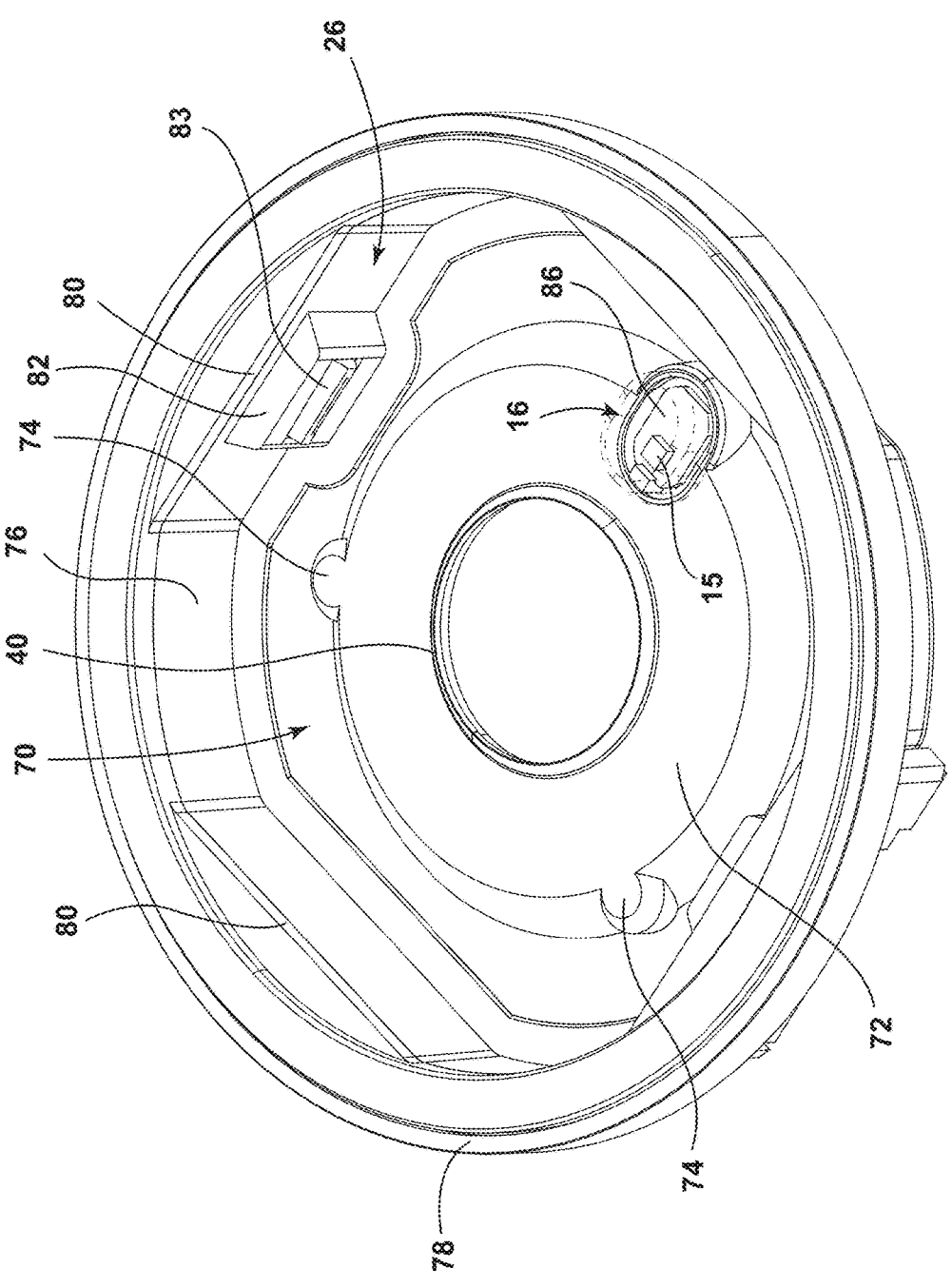
FIG. 4 is a top perspective view of a basin located on a base of a food processing appliance according to an aspect of the present disclosure.

With reference now to FIGS. 3 and 4, the top surface 24 of the base 12 and the bottom surface 28 of the first vessel type 14A are illustrated. An inner wall 68 may extend from the bottom surface 28 that at least partially enters the basin 26 during connection of the first vessel type 14A. The inner wall 68 may be semi-annular in shape and may define an elongated opening 69 that is elongated in the vertical direction to accommodate movement of the push rod 46 between positions. The basin 26 may be substantially circular defining an outer ring depression 70 and a central bulge 72 located centrally from the outer ring depression 70 and extending upwardly towards the first vessel type 14A. The output drive hub 40 may be located centrally on the central bugle 72. The central bulge 72 includes an outer perimeter defining at least one protrusion 74 that extends radially outwardly therefrom. The at least one protrusion 74 may include a plurality of protrusions 74 (e.g., three or more) that are equally spaced around the outer perimeter of the central bulge 72. The at least one protrusion 74 may interlock with the bottom surface 28 of the first vessel type 14A. The magnetic compass assembly 16 may be located on one of the at least one protrusion 74.

With continued reference to FIGS. 3 and 4, the basin 26 may be defined by a basin wall 76 extending to a rim 78. The rim 78 may be substantially annular in shape. The basin wall 76 and/or rim 78 may define sections 80 that extend radially inwardly towards the central bulge 72. In this manner, the semi-annular shape of the inner wall 68 of the first vessel type 14A may only enter the basin 26 at certain orientations. For example, the sections 80 may be substantially flat and may correspond to flat sections of the inner wall 68. At least one orientation projection 82 may extend from the basin wall 76. For example, the at least one orientation projection 82 may be located on the sections 80 of the basin wall 76 (e.g., a pair of orientation projections 82 that are on diametrically opposed sections 80). In some embodiments, the orientation projections 82 each include a clip member 83 for selectively engaging with the bottom surface 28 and/or inner wall 68. The inner wall 68 may define recesses 84 (FIGS. 1 and 2) corresponding to the orientation projections 82. In this manner, the sections 80 and the orientation projections 82 may permit connection of the first vessel type 14A in a single orientation that vertically aligns the first magnetic key 20A and the magnetic compass assembly 16. The magnetic compass assembly 16 may include a substrate 86 connected to the magnetic sensor 15, such as a printed circuit board ("PCB") that is operably connected to the control system 100. A clip 88 may extend from the top surface 24 and a housing 90 may engage with the clip 88 to protect the magnetic compass assembly 16. The top surface 24 may define a pocket 92 and the housing 90 may define a bottom housing surface 94 sized to fit within the pocket 92. The bottom housing surface 94 and pocket 92 may be non-planar. For example, the bottom housing surface 94 and pocket 92 may at least partially match the contour of the central bulge 72 and the ring depression 70.

Figure 5:
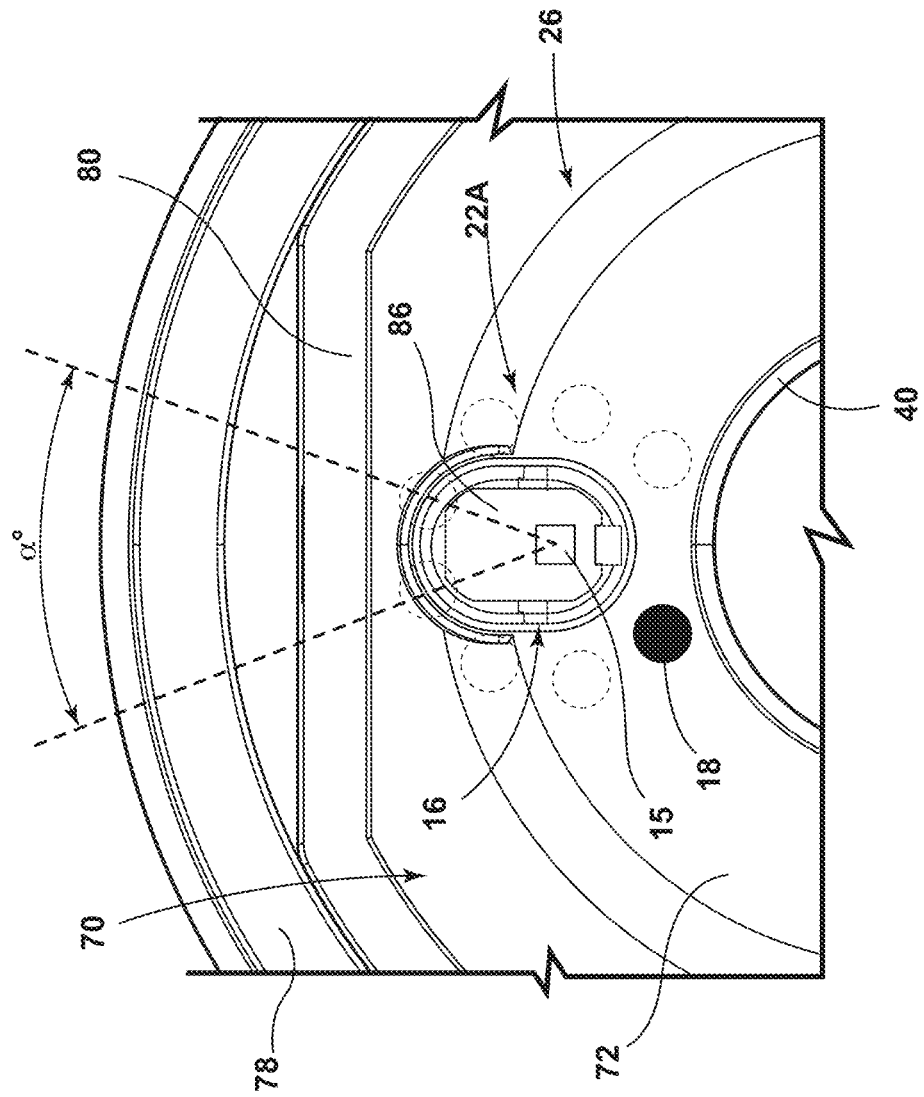
FIG. 5 is a top sectional view of a magnetic compass assembly and a first arrangement of magnets according to an aspect of the present disclosure.

With reference to FIG. 5, the first arrangement 22A of magnets 18 is highlighted and additional potential magnet locations 96 (e.g., for the other arrangements 22B-22N) are provided in phantom. The first arrangement 22A includes a single magnet 18. With reference now to FIGS. 6A-6C, various other exemplary arrangements 22B-22D of the magnets 18 are illustrated. With reference initially to FIG. 6A, a portion of a second vessel type 14B having a second magnetic key 20B with a second arrangement 22B of magnets 18 is illustrated. The second vessel type 14B may include a second appliance 30B that may be unique to the other vessel types in functionality and/or structure. In the second arrangement 22B, a single magnet 18 is located clockwise to an adjacent potential magnet location 96 next to the location of the magnet 18 in the first arrangement 22A. With reference now to FIG. 6B, a portion of a third vessel type 14C having a third magnetic key 20C with a third arrangement 22C of magnets 18 is illustrated. The third vessel type 14C may include a third appliance 30C that may be unique to the other vessel types in functionality and/or structure. In the third arrangement 22C, a single magnet 18 is located clockwise to a potential magnet location 96 next to the location of the magnet 18 in the second arrangement 22B. With reference now to FIG. 6C, a portion of a fourth vessel type 14D having a fourth magnetic key 20D with a fourth arrangement 22D of magnets 18 is illustrated. The fourth vessel type 14D may include a fourth appliance 30D that may be unique to the other vessel types in functionality and/or structure. In the fourth arrangement 22D, a single magnet 18 is located counter-clockwise to an adjacent potential magnet location 96 next to the location of the magnet 18 in the first arrangement 22A.

With reference now to FIGS. 5-6C, the various arrangements 22A-22D are exemplary in nature. In this manner, the single magnet 18 may be located in any of the potential magnet locations 96 and be distinguished by the magnetic compass assembly 16. The potential magnet locations 96 may each be located substantially on the same plane. Each potential magnet location 96 may be equally spaced along a circumference extending about the magnet sensor 15 (e.g., the magnetic sensor 15 located at a center of the circumference). The magnet 18 in each arrangement 22A-22D may have the same strength. In this manner, the magnet sensor 15 may distinguish between the location of a magnet 18 on a two-dimensional plane and the control system 100 may receive the reading to assign functionality profiles to the base 12.

With reference now to FIGS. 6D-6F, additional exemplary arrangements 22E-22G each having two magnets 18 are illustrated. With reference initially to FIG. 6D, a portion of a fifth vessel type 14E having a fifth magnetic key 20E with a fifth arrangement 22E of magnets 18 is illustrated. The fifth vessel type 14E may include a fifth appliance 30E that may be unique to the other vessel types in functionality and/or structure. In the fifth arrangement 22E, a pair of magnets 18 are located in a pair of adjacent potential magnet locations 96. With reference now to FIG. 6E, a portion of a sixth vessel type 14F having a sixth magnetic key 20F with a sixth arrangement 22F of magnets 18 is illustrated. The sixth vessel type 14F may include a sixth appliance 30F that may be unique to the other vessel types in functionality and/or structure. In the sixth arrangement 22F, one of the magnets 18 is located clockwise. With reference now to FIG. 6F, a portion of a seventh vessel type 14G having a seventh magnetic key 20G with a seventh arrangement 22G of magnets 18 is illustrated. The seventh vessel type 14G may include a seventh appliance 30G that may be unique to the other vessel types in functionality and/or structure. In the seventh arrangement 22G one of the magnets 18 is located counter-clockwise.

With reference now to FIGS. 6D-6F, the various arrangements 22E-22G are exemplary in nature. In this manner, the pair of magnets 18 may be located in any of the potential magnet locations 96 and be distinguished by the magnetic compass assembly 16. The potential magnet locations 96 may each be located substantially on the same plane. Each potential magnet location 96 may be equally spaced along a circumference extending about the magnet sensor 15. The magnet 18 in each arrangement 22E-22G may have the same strength. In this manner, the magnet sensor 15 may distinguish between the location of a magnets 18 on a two-dimensional plane and the control system 100 may receive the reading to assign functionality profiles to the base 12.

With reference now to FIGS. 6G-6I, additional exemplary arrangements 22H-22J each having two magnets 18 are illustrated. With reference initially to FIG. 6G, a portion of an eighth vessel type 14H having an eighth magnetic key 20H with an eighth arrangement 22H of magnets 18 is illustrated. The eighth vessel type 14H may include an eighth appliance 30H that may be unique to the other vessel types in functionality and/or structure. In the eighth arrangement 22H, a plurality of magnets 18 (e.g., three or more) are located in adjacent potential magnet locations 96. With reference now to FIG. 6H, a portion of a ninth vessel type 14I having a ninth magnetic key 20I with a ninth arrangement 22I of magnets 18 is illustrated. The ninth vessel type 14I may include a ninth appliance 30I that may be unique to the other vessel types in functionality and/or structure. In the ninth arrangement 22I, one of the magnets 18 is located clockwise. With reference now to FIG. 6I, a portion of a tenth vessel type 14J having a tenth magnetic key 20J with a tenth arrangement 22J of magnets 18 is illustrated. The tenth vessel type 14J may include a tenth appliance 30J that may be unique to the other vessel types in functionality and/or structure. In the tenth arrangement 22J one of the magnets 18 is located counter-clockwise.

With reference now to FIGS. 6G-6I, the various arrangements 22H-22J are exemplary in nature. In this manner, the plurality of magnets 18 may be located in any of the potential magnet locations 96 and be distinguished by the magnetic compass assembly 16. The potential magnet locations 96 may each be located substantially on the same plane. Each potential magnet location 96 may be equally spaced along a circumference extending about the magnet sensor 15. The magnet 18 in each arrangement 22H-22J may have the same strength. In this manner, the magnet sensor 15 may distinguish between the location of a magnets 18 on a two-dimensional plane and the control system 100 may receive the reading to assign functionality profiles to the base 12. While the arrangements 22H-22J are illustrated with three magnets 18, it should be appreciated that additional magnets 18 (e.g., four or more, five or more, etc.) may be incorporated and distinguished by the magnetic compass assembly 16.

With reference now to FIGS. 6J-6L, additional exemplary arrangements 22K-22M each having a single magnet 18 are illustrated. With reference initially to FIG. 6J, a portion of a eleventh vessel type 14K having a eleventh magnetic key 20K with a eleventh arrangement 22K of magnets 18 is illustrated. The eleventh vessel type 14K may include an eleventh appliance 30K that may be unique to the other vessel types in functionality and/or structure. In the eleventh arrangement 22K, a single magnet 18 is in the same potential magnet location 96 as the first arrangement 22A. However, the magnet 18 is distinguishable from the other arrangements based on a variance in at least one of a third axis location or a magnetic strength. With reference now to FIG. 6K, a portion of a twelfth vessel type 14L having a twelfth magnetic key 20L with a twelfth arrangement 22L of magnets 18 is illustrated. The twelfth vessel type 14L may include a twelfth appliance 30L that may be unique to the other vessel types in functionality and/or structure. In the twelfth arrangement 22L, a single magnet 18 is located in the same potential magnet location 96 as the first arrangement 22A. However, the magnet 18 is distinguishable from the other arrangements based on a further variance in at least one of a third axis location or a magnetic strength. With reference now to FIG. 6L, a portion of a thirteenth vessel type 14M having a thirteenth magnetic key 20M with a thirteenth arrangement 22M of magnets 18 is illustrated. The thirteenth vessel type 14M may include a thirteenth appliance 30M that may be unique to the other vessel types in functionality and/or structure. In the thirteenth arrangement 22M, a single magnet 18 is located in the same potential magnet direction from the magnetic sensor 15 as the first arrangement 22A. However, the magnet 18 is distinguishable from the other first arrangement 22A based on a variance in proximity. It should be appreciated that the variance along the third axis location described in reference to FIGS. 6J-6K may alternatively include variances in distance of the magnet 18 with respect to the magnetic sensor 15 on the two-dimensional plane (e.g., FIG. 6L). In this manner, magnets 18 of the same or varying strength may be located in the potential magnet locations 96 on two or more common circumferences or an array that is not on a common circumference.

With reference now to FIGS. 5-6I, the location of the magnets 18 (e.g., on two or three dimensions), the distance of the magnets 18 from the magnetic sensor 15, the number of the magnetics 18, and the strength of the magnets 18 described in reference to the various arrangements 22A-22M may be merged in combinations distinguishable by the magnetic compass assembly 16. In this manner, an extensive number of arrangements 22A-22N may be distinguishable by the magnetic compass assembly 16, which may be singular. The potential magnet locations 96 have been illustrated as residing in an equally spaced relationship along the common circumference. In some embodiments, each pair of potential magnet locations 96 define an angle "α" with magnetic sensor 15. The angle α may be 5° or more (i.e., for a total of 72 potential magnet locations 96 along the common circumference), 10° or more, 15° or more, 20° or more, 30° or more, 40° or more, 60° or more, or 80° or more. As best illustrated in FIG. 5, the potential magnet locations 96 may include eight potential magnet locations 96 equally spaced around the common circumference such that the angle α may be equal to 40°. The number of arrangements 22A-22N are each distinguishable by the magnetic sensor 15, that reading of which may be communicated to the control system 100 to effectuate other functionalities.

With reference now to FIG. 7, the control system 100 of the food processing appliance 10 may include at least one electronic control unit (ECU) 102. The ECU 102 may include a processor 104 and a memory 106. The processor 104 may include any suitable processor 104. Additionally, or alternatively, each ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the food processing appliance 10. The motor 38 may, therefore, be controlled by the control system 100 as dictated by the user interface 42 and the operational parameters. The memory 106 may, therefore, include a first magnetic key profile 108A through an N magnetic key profile 108N. For example, each magnetic key profile 108A-108N may be pre-saved into the memory 106 as a distinguishable magnetic influence on the magnetic sensor 15. Each magnetic key profile 108A-108N may be associated with an appliance 30A-30N and the operational parameters 110A-110N to safely and effectively use the particular appliance 30A-30N (e.g., the speed of the motor 38, a time limit for processing, a pulse sequence for processing). Each magnetic key profile 108A-108N may further be associated with user option parameters 112A-112N. For example, upon a determination of the appliance 30A-30N, based on recognition of the magnetic key profile 108A-108N, the control system 100 may provide additional options on the user interface 42 (e.g., pulsing sequences, heating functions, additional food processing options, and/or the like).

In accordance with FIGS. 1-7, a method 200 of operating a food processing appliance is illustrated in FIG. 8. By reference numeral 202, a base with a magnetic compass assembly and a plurality of food vessel types each including a unique magnetic key are provided. At step 204, one of the plurality of food vessel types are connected to the base to align the magnetic key with the magnetic compass. At step 206, the magnetic key is recognized and associated with an appliance. For example, the magnetic key may include an arrangement of magnets that are recognizable by one or more of a location of the magnets (e.g., on two or three dimensions), a distance of the magnets from the a magnetic sensor of the magnetic compass assembly, a number of the magnetics (e.g., one, two, or more), and a strength of the magnets. At step 208, the base operation is configured in accordance with the appliance type. For example, the base is configured with at least one of an operational parameter or a user option associated with the appliance. Steps 204-208 may be repeated with the other vessel types, and each vessel type may be associated with a different appliance and at least one different operational parameter or user option.

The invention disclosed herein is further summarized in the following paragraphs and is further characterized by combinations of any and all of the various aspects described therein.

According to one aspect of the present disclosure, a food processing appliance includes a base configured to selectively receive a plurality of vessel types. At least one of the plurality of vessel types includes a first magnetic key that includes at least one magnet disposed in a first arrangement of magnets along at least two axes. A magnetic compass assembly that is located on the base is configured to detect a reading that includes a presence and location of magnets on the at least two axes. The food processing appliance also includes a processor and a memory. The memory includes instructions that, when executed by the processor, cause the processor to receive the reading from the magnetic compass assembly and identify the at least one vessel type from the plurality of vessel types based on the first arrangement of the at least one magnet.

According to another aspect of the present disclosure, a magnetic compass assembly includes a magnetic sensor.

According to yet another aspect of the present disclosure, a magnetic sensor is a three-axis magnetometer and at least two axes include three axes.

According to still another aspect of the present disclosure, a plurality of vessel types each include a magnetic key that includes an arrangement of magnets that is unique.

According to another aspect of the present disclosure, arrangements of magnets each include potential magnet locations on a common circumference.

According to yet another aspect of the present disclosure, a magnetic sensor is aligned centrally in the common circumference when operable.

According to still another aspect of the present disclosure, at least one magnetic sensor includes two or more magnets.

According to another aspect of the present disclosure, at least one of the plurality of vessel types includes a lib and a first magnetic key is operably connected to the lib by a carrier element.

According to yet another aspect of the present disclosure, a carrier element includes a push rod and a lib pushes a first magnetic key into close proximity to a magnetic compass assembly when the lib is in a closed position.

According to still another aspect of the present disclosure, a spring element biases a push rod upwardly towards a lib and pushes a first magnetic key away from a magnetic compass assembly when the lib is in an open position.

According to another aspect of the present disclosure, a memory includes instructions that, when executed by a processor, cause the processor to determine if a lib is in an open position or a closed position, and prevent operation of a base when the lib is in the closed position.

According to another aspect of the present disclosure, a food processing appliance includes a base configured to selectively receive a plurality of vessel types. At least one of the plurality of vessel types includes a first magnetic key that includes at least two magnets disposed in a first arrangement of magnets along at least two axes. A magnetic compass assembly that is located on the base is configured to detect a reading that includes a presence and location of magnets on the at least two axes. The plurality of vessel types also includes a processor and a memory. The memory includes instructions that, when executed by the processor, cause the processor to receive the reading from the magnetic compass assembly and identify the at least one vessel type from the plurality of vessel types based on the first arrangement of the at least two magnets.

According to yet another aspect of the present disclosure, a magnetic compass assembly includes a magnetic sensor.

According to still another aspect of the present disclosure, at least two magnets are located on a common circumference.

According to another aspect of the present disclosure, a magnetic sensor is aligned centrally in a common circumference.

According to yet another aspect of the present disclosure, a first magnetic key includes a spacer element that defines a space between a first magnetic key and a magnetic compass assembly.

According to another aspect of the present disclosure, a food processing appliance includes a base configured to selectively receive a plurality of vessel types. A magnetic compass assembly that is located on the base is configured to detect a reading that includes a presence and location of magnets on at least two axes. The plurality of vessel types includes a first vessel type that has a first appliance. The first vessel type includes a first magnetic key that includes at least one magnet disposed in a first arrangement of magnets along the at least two axes. The plurality of vessel types further includes a second vessel type that has a second appliance. The second vessel type includes a second magnetic key that includes at least one magnet disposed in a second arrangement of magnets along the at least two axes. The plurality of vessel types also includes a processor and a memory. The memory includes instructions that, when executed by the processor, cause the processor to receive the reading from the magnetic compass assembly and identify which of the first vessel type or the second vessel type is connected to the base from a reading by the magnetic compass assembly of the first arrangement or the second arrangement of the at least one magnet and configure operational parameters of the base in accordance with the first appliance or the second appliance.

According to still another aspect of the present disclosure, at least one magnet in a first arrangement and at least one magnet in a second arrangement are located in different positions along a common circumference while operably aligned with a magnetic compass assembly.

According to another aspect of the present disclosure, at least one magnet in a first arrangement is located from a magnetic compass assembly a first distance upon connection of a first vessel type with a base and at least one magnet in a second arrangement is located from the magnetic compass assembly a second distance upon connection of a second vessel type with the base that is different than the first distance.

According to yet another aspect of the present disclosure, at least one magnet in a first arrangement has a first strength and at least one magnet in a second arrangement has a second strength that is different than a first strength.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A food processing appliance comprising:
a base configured to selectively receive a plurality of vessel types, wherein at least one of the plurality of vessel types includes a first magnetic key that includes at least one magnet disposed in a first arrangement of magnets about a common circumference of potential magnet locations along at least two axes;
a magnetic compass assembly including a magnetic sensor located on the base and configured to become centrally aligned with the common circumference of potential magnet locations to detect a reading that includes a presence and location of the at least one magnet on the common circumference of potential magnet locations; and
a processor and a memory, the memory including instructions that, when executed by the processor, cause the processor to:
receive the reading from the magnetic magnet sensor; and
identify the at least one vessel type from the plurality of vessel types based on the presence, and location of the at least one magnet on the common circumference of potential magnet locations.

2. The food processing appliance of claim 1, wherein the magnetic sensor is a magnetometer.

3. The food processing appliance of claim 2, wherein the magnetometer is a three-axis magnetometer and the at least two axes includes three axes.

4. The food processing appliance of claim 1, wherein the plurality of vessel types each include a magnetic key that includes an arrangement of magnets about the common circumference of potential magnet locations that is unique.

5. The food processing appliance of claim 4, wherein at least some of the arrangements of magnets include two or more magnets on the common circumference of potential magnet locations.

6. The food processing appliance of claim 4, wherein at least some of the arrangements of magnets include magnets having a different strength than other ones of the arrangements of magnets.

7. The food processing appliance of claim 6, wherein the at least one magnet includes three or more magnets.

8. The food processing appliance of claim 1, wherein the at least one vessel type includes a lid and the first magnetic key is operably connected to the lid by a carrier element.

9. The food processing appliance of claim 8, wherein the carrier element includes a push rod and the lid pushes the first magnetic key into close proximity to the magnetic compass assembly when the lid is in a closed position.

10. The food processing appliance of claim 9, wherein a spring element biases the push rod upwardly towards the lid and pushes the first magnetic key away from the magnetic compass assembly when the lid is in an open position.

11. The food processing appliance of claim 10, wherein the memory further includes instructions that, when executed by the processor, cause the processor to:
determine if the lid is in the open position or the closed position; and
prevent operation of the base when the lid is in the closed position.

12. A food processing appliance comprising:
a base configured to selectively receive a plurality of vessel types, wherein at least one of the plurality of vessel types includes a first magnetic key that includes at least two magnets disposed in a first arrangement of magnets along at least two axes;
a magnetic compass assembly located on the base including a magnetic sensor configured to become aligned between the at least two magnets to detect a reading that includes a presence and location of the at least two magnets relative to the magnetic sensor on the at least two axes; and
a processor and a memory, the memory including instructions that, when executed by the processor, cause the processor to:
receive the reading from the magnetic sensor; and
identify the at least one vessel type from the plurality of vessel types based on the first arrangement of the at least two magnets.

13. The food processing appliance of claim 12, wherein the magnetic sensor is a magnetometer.

14. The food processing appliance of claim 12, wherein the at least two magnets are located on a common circumference.

15. The food processing appliance of claim 14, wherein the magnetic sensor is aligned centrally in the common circumference.

16. The food processing appliance of claim 12, wherein the first magnetic key includes a spacer element that defines a space between the first magnetic key and the magnetic compass assembly.

17. A food processing appliance comprising:
a base configured to selectively receive a plurality of vessel types;
a magnetic compass assembly located on the base including a magnetic sensor configured to detect a reading that includes a presence and location of magnets relative to the magnetic sensor on at least two axes;
the plurality of vessel types including a first vessel type having a first appliance, the first vessel type including a first magnetic key that includes at least one magnet disposed in a first arrangement of magnets along the at least two axes; and
the plurality of vessel types further including a second vessel type having a second appliance, the second vessel type including a second magnetic key that includes at least one magnet disposed in a second arrangement of magnets along the at least two axes, wherein the at least one magnet in the first arrangement is located in a different location on the at least two axes relative to the magnetic sensor than the at least one magnet in the second arrangement; and
a processor and a memory, the memory including instructions that, when executed by the processor, cause the processor to:
receive the reading from the magnetic sensor to determine the relative location between the magnetic sensor and the at least one magnet;

identify which of the first vessel type or the second vessel type is connected to the base based on the relative location between the magnetic sensor and the at least one magnet; and configure operational parameters of the base in accordance with the first appliance or the second appliance.

18. The food processing appliance of claim 17, wherein the at least one magnet in the first arrangement and the at least one magnet in the second arrangement are located in different positions along a common circumference while operably aligned with the magnetic compass assembly.

19. The food processing appliance of claim 17, wherein the at least one magnet in the first arrangement is located from the magnetic sensor a first distance upon connection of the first vessel type with the base and the at least one magnet in the second arrangement is located from the magnetic sensor a second distance upon connection of the second vessel type with the base that is different than the first distance.

20. The food processing appliance of claim 17, wherein the at least one magnet in the first arrangement has a first strength and the at least one magnet in the second arrangement has a second strength that is different than the first strength.

* * * * *